United States Patent [19]

Jelinek

[11] Patent Number: 4,634,132

[45] Date of Patent: Jan. 6, 1987

[54] ELASTOMERIC SEAL ASSEMBLY WITH VARIABLE THICKNESS SHIM

[75] Inventor: Jerry G. Jelinek, La Habra, Calif.

[73] Assignee: Parker Hannifin Corporation, Cleveland, Ohio

[21] Appl. No.: 736,050

[22] Filed: May 20, 1985

[51] Int. Cl.[4] .............................................. F16J 15/00
[52] U.S. Cl. .......................................... 277/11; 277/9; 277/189; 277/233
[58] Field of Search ................... 277/225, 212 C, 229, 277/233, 234, 236, 166, 227, 9, 11, 178, 189; 411/535; 428/43, 352; 15/215

[56] References Cited

U.S. PATENT DOCUMENTS

| | | | |
|---|---|---|---|
| 1,816,704 | 7/1931 | Thornburgh | 277/233 X |
| 2,003,934 | 6/1935 | Hansel | 277/233 |
| 2,021,571 | 11/1935 | Victor et al. | 277/233 X |
| 2,130,110 | 9/1938 | Victor et al. | 277/232 |
| 2,626,193 | 1/1953 | Patterson | 277/233 X |
| 3,400,421 | 9/1968 | Nappi et al. | 15/215 |
| 3,627,337 | 12/1971 | Pippert | 277/233 |
| 3,726,178 | 4/1973 | Dimitry | 277/166 X |
| 3,944,235 | 3/1976 | Gordon | 277/233 X |

Primary Examiner—Allan N. Shoap
Attorney, Agent, or Firm—Joseph B. Balazs

[57] ABSTRACT

An adjustable elastomeric seal assembly for accommodating gap tolerances consists of a rubber seal supported by a retainer, the latter consisting of a substrate and a plurality of shims. The assembly is joined as an integral structure and the shims may be peeled individually to fit gap dimensions. Preferably, the substrate thickness equals the minimum gap dimension and together with the plural shims equals or exceeds the maximum gap dimension to provide several selectable combined thicknesses therebetween. The thickness of the rubber seal is greater than the maximum gap dimension but provides suitable sealing as well as the minimum dimension.

11 Claims, 4 Drawing Figures

ELASTOMERIC SEAL ASSEMBLY WITH VARIABLE THICKNESS SHIM

BACKGROUND OF THE INVENTION

This invention relates to retainer-supported elastomeric seal assemblies and more particularly, to an adjustable assembly which includes a selectable shim feature therein.

It is often necessary to seal certain devices which have interfacial gaps or separations such as certain components of an engine, turbine or similar power train-like mounting or assembly. However, a major problem confronting the designer and assembler is the "stack-up" of tolerances of the various components, often requiring selective assembly and/or customized shimming. This, in turn, can create some very difficult sealing problems because of the varying gaps or separations occurring as a result of these tolerances or misalignments.

Currently, one way this situation is handled is to provide the installer with differently dimensioned seal assemblies so that he can measure the gap dimension and select an appropriately sized assembly. Another technique is to provide a "nominal" seal assembly and a plurality of shims, from which the installer can select. It is apparent though that these techniques create additional burdens upon the installer who must have the various components at hand and assure that their installation is made correctly and compatibly.

SUMMARY OF THE INVENTION

Many of these difficulties are overcome by the teachings of the instant invention wherein an elastomeric seal member is combined with an adjustable retainer structure in a unitary assembly which can be conveniently modified by the installer. The retainer consists of a metal or plastic substrate of fixed thickness which serves as and is equal to the minimum gland or groove depth. This substrate, in turn, is surmounted by plied-up layers of thin, bonded in place shims, each on the order of a few thousandths thick. Significantly, the total stack height of this hybrid combination of plies and substrate equals the maximum gland or groove depth for the elastomeric seal member attached thereto.

The seal member itself may be circular, square, oval, rectangular or the like in cross-sectional shape to suit any particular application. However, the overall height of the seal member is predetermined to provide the optimum squeeze over the maximum to minimum range of the retainer for effective static sealing. Furthermore, the seal member can be molded in place during seal vulcanization, being either chemically or mechanically attached in the process, or it can be installed later, again by bonding or attaching it to the hybrid retainer stack.

It is now a simple matter for an installer to measure the interfacial gap or groove occurring in the structure to be sealed. He can then select an appropriate seal assembly having a desired range and peel off layers as required to obtain the correct retainer thickness. Since the seal cross section is dimensioned to perform effectively within the entire range of the retainer, the resultant structure can be confidently installed in the gap for a close and sealed fit. Both shimming and sealing are thus accomplished with this integrated device while the variables of mismatching and component non-availability are removed from the installer.

DETAILED DESCRIPTION OF THE INVENTION

Figure 1:
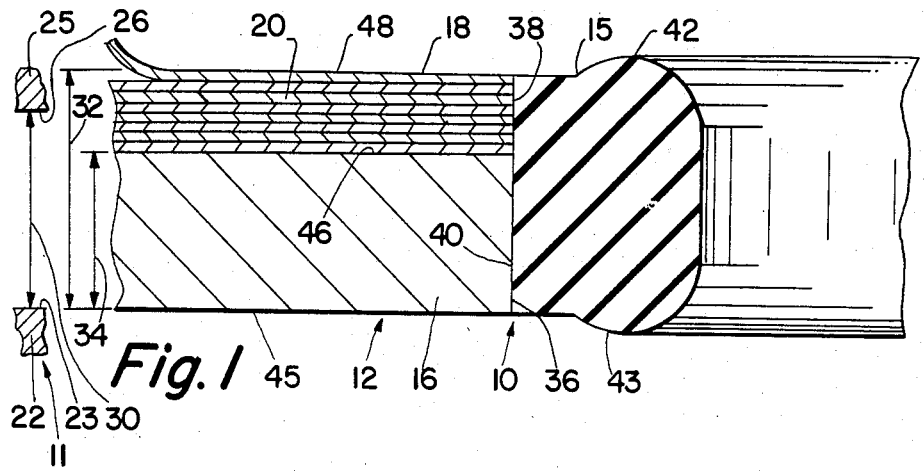
FIG. 1 is a partial sectional view of a seal assembly according to the invention shown in relation to a part of structure to be sealed.

Referring now to the drawings and initially to FIG. 1, there is shown a first embodiment of seal assembly 10 in relation to a structure 11 to be sealed. Seal assembly 10 comprises retainer 12 and elastomeric seal member 15. Retainer 12, in turn, comprises substrate section 16 and shim section 18, the latter consisting of a plurality of shim layers 20.

As an example, for purposes of explanation of the invention, structure 11 consists of body member 22 having sealing surface 23 thereon and which also includes an opening through which a drive shaft or the like might protrude (not shown) and which is to be sealed by seal element 15. The remainder of structure 11 is a cover plate or the like 25 which includes a sealing surface 26 complementary to surface 23 and which forms a gap therebetween, having a thickness or width depicted by arrow identified by leadline 30.

While gap 30 is the actual size of the space between surfaces 23, 26 and is determined by other parameters of structure 11 which define such spacing, in practice the spacing of surfaces 23, 26 is designed to fall within a range of tolerance shown by arrows in FIG. 1 as maximum gap depth 32 and minimum gap depth 34. It is incumbent upon an installer of a seal assembly to select one which would fit such gap 30 or to use shims or the like to modify a seal assembly to suit such application. By virtue of the instant invention, this process is radically modified and the integrity of the procedure enhanced. Rather than selecting or adding to a certain seal structure, the installer uses the same seal assembly 10 which is suitable for all applications which fall within a specified tolerance range and removes portions of the assembly 10 as necessary to conform to a particular gap 30.

This expedient is provided by the plurality of shim layers 20 which are mounted upon substrate 16 and which may be peeled as required and removed from the seal assembly 10. Substrate 16 is typically a metal plate although it might be one of the many forms of plastic as well, and is fairly rigid, but flexible, to provide support for the remainder of seal assembly 10. Substrate 16 has a configuration suitable to match the corresponding configuration of mating surface 23 to be sealed, and in this embodiment includes an opening formed by cylindrical wall 36. Typically, substrate 16 has a thickness on the order of 0.030 inch and is surmounted in turn by the several shim layers, each typically on the order of a few thousandths of an inch. In this example, eight shim layers 20 are depicted, so that the shim section 18 overall thickness might be on the order of 0.018 inch and the overall retainer 12 thickness on the order of 0.048 inch. The shim layers 20 conform substantially, although not necessarily, to the planar shape of underlying substrate 16 and terminate at an opening to form a cylindrical wall 38 coextensive with wall 36 of substrate 16. Bonded to walls 36, 38 is seal element 15 of generally doughnut shape having outer peripheral cylindrical surface 40 in engagement with walls 36, 38 and raised crown surfaces 42, 43 joined at the inner periphery, the crown surfaces providing the sealing surfaces for seal assembly 10. Crown surfaces 42, 43 project outwardly respectively, of the outermost of the shim layers 20 and substrate lower surface 45.

Substrate 16 is dimensioned in thickness so that the separation between substrate upper surface 46 and lower surface 45 is substantially the same as the minimum gap depth 34 of structure 11. The several shim layers 20 are dimensioned so that the outer surface 48 of the outermost shim layer 20 is at a dimension substantially equal to the maximum gap depth 32 or stated another way, the thickness of substrate 16 and shim section 18, in its entirety, is equal to the maximum gap depth 32. It will be apparent then, that one or more of the shim layers 20 may be removed from the stack constituting shim section 18 to match the dimension of actual gap 30, or as close as can be effected by the selection of thicknesses of shim layers 20. Preferably, all of shim layers 20 are of the same thickness to make selection easy for the installer, however, other thickness combinations could be used as well.

It is significant to note that seal member 15 must be designed as well to seal between surfaces 23, 26 at the maximum or minimum gap depths 32, 34 respectively. Rubber is preferred for seal element 15, however, many other elastomers could provide suitable distortion or compression characteristics to suit the purpose and various seal shapes other than the depicted, generally circular crown surfaces 42, 43 would work effectively.

In the embodiment of FIG. 1, shim layers 20 are thin metal plates and are adhesively joined to one another and to substrate 16. Seal element 15 is molded in place to substrate 16 and shim section 18 with the bond being achieved during vulcanization. However, it should be apparent that the entire structure of seal assembly 10 could be bonded into an integral unit simultaneously during vulcanization utilizing a heat settable adhesive for the shim layers 20 or that very many other variations could be made.

Figure 2:
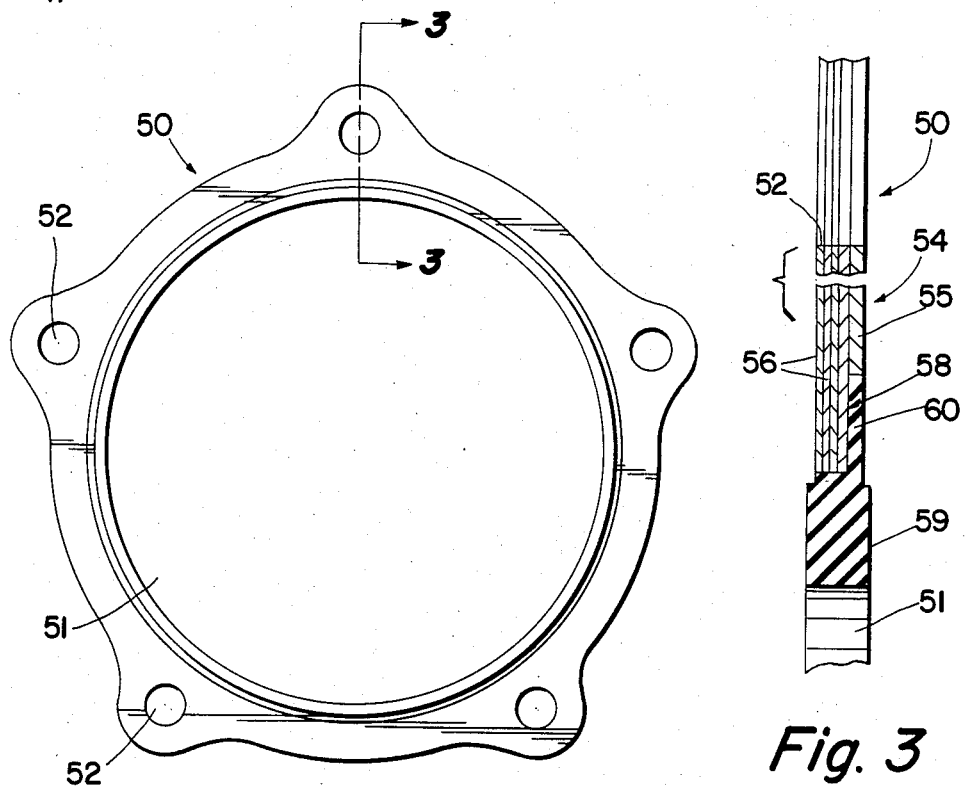
FIG. 2 is a plan view of a second embodiment of seal assembly according to the invention.
Figure 3:
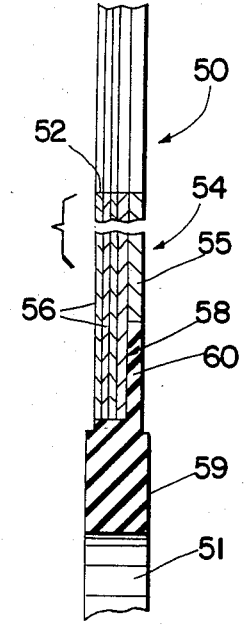
FIG. 3 is a partial sectional view of the seal assembly of FIG. 2, taken along the lines 3—3.

Yet another variation of the invention is depicted in the showings of FIGS. 2 and 3. Here, a generally circular seal assembly 50 having opening 51 therein is configured for sealing about a shaft or the like. Bolt hole openings 52 are provided for clamping bolts to secure the assembly 50 between planar structures having a nominal gap spacing. Seal assembly 50 comprises flat retainer plate 54 made up of substrate plate 55 and plural shim plates 56. In this embodiment, shim plates 56 extend inwardly into opening 51 further than substrate plate 55 thereby forming step 58 therebetween. Seal element 59 is generally rectangular in section as seen in FIG. 3 and includes shoulder 60 at its outer periphery which fits within step 58 to provide improved mechanical inter-engagement with retainer 54. Seal element 59, again, may be molded in place and bonded to substrate 55 as well as shim plates 56 or may be otherwise secured, as for example, simply by the mechanical engagement. Seal assembly 50 is otherwise similar to seal assembly 10 described in relation to FIG. 1. Substrate plate 55 is dimensioned to have a thickness equal to a desired minimum gap depth and the thickness of the entire retainer 54 is dimensioned to be equal to the maximum gap depth, so that shim plates 56 can be peeled and discarded, as required, to match an actual gap dimension.

Figure 4:
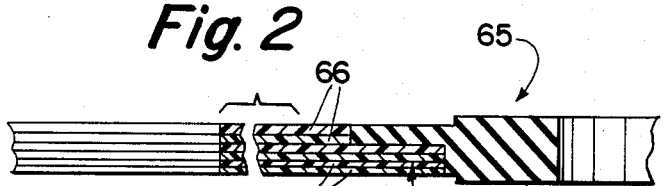
FIG. 4 is a view similar to that of FIG. 3 of a third embodiment of seal assembly according to the invention.

A slightly different structure is shown in FIG. 4 which is a view taken in section similar to that of FIG. 3. In this embodiment, seal assembly 65 comprises a retainer having a laminated substrate formed of identical plates 66, surmounted by a plurality of shim plates 68, again forming a step 69 therebetween. Seal element 70 is molded in place at step 69 and at the inner peripheries of substrate plates 66 and shim plates 68 and provides a generally rectangular seal configuration for sealing between spaced plates, flanges or the like. Shim plates 68 may be removed as by peeling to fit a particular dimension, as previously described. In this embodiment, the entire laminated structure provides a convenient form of manufacture whereby the entire seal assembly 65 may be integrated into a common structure in a single joining step using similar laminated sections for both the substrate plates 66 and the shim plates 68.

I claim:

1. An elastomeric seal assembly for sealing a joint between adjacent surfaces, said assembly comprising a retainer and elastomeric seal combination, said retainer comprising a substrate section surmounted by a plurality of outer shim layers, said substrate section being of rigid material, said shim layers being flexible and substantially in the same shape as said substrate section, said shim layers and said substrate section defining a predetermined thickness of said retainer, one or more of said shim layers being completely removable for adjustment of the thickness of said retainer, said elastomeric seal being in engagement with said substrate section and said shim layers and having at least one sealing surface thereon projecting outwardly of the outermost said shim layer of said retainer, and means for joining said seal and said retainer in a unitary structure for placement in a joint to be sealed whereby the final thickness of said retainer may be adjusted by removal of one or more of said shim layers without affecting the integrity of said seal assembly.

2. The seal assembly set forth in claim 1 wherein said elastomeric seal is joined both to said substrate section and said shim section.

3. The seal assembly set forth in claim 2 wherein said elastomeric seal is a molded in place seal and is bonded to said substrate section and said shim section.

4. The seal assembly set forth in claim 1 wherein said retainer is annular and surrounds an opening therein and said elastomeric seal is disposed at the inner periphery of said retainer for sealing said opening.

5. The seal assembly set forth in claim 4 wherein said retainer opening is circular and said seal assembly is adapted for sealing a cylindrical shaft disposed in said opening.

6. The seal assembly set forth in claim 1 wherein said shim layers are bonded to one another and are individually separable for adjusting the thickness of said shim section.

7. The seal assembly set forth in claim 6 wherein said shim layers and said substrate section are metal.

8. The seal assembly set forth in claim 6 wherein said shim layers and said substrate section are plastic.

9. The seal assembly set forth in claim 1 wherein said retainer is a thin plate-like member and each of said shim layers is a similarly shaped thin plate member of lesser thickness than said substrate section.

10. The seal assembly set forth in claim 9 wherein said seal assembly is annular and adapted for sealing an annular opening and said elastomeric seal is positioned at the inner periphery of said retainer and is bonded to each of said shim layers and to said substrate section.

11. An elastomeric seal assembly, said assembly having a retainer adapted for positioning in the gap between complementary faces of a device to be sealed, said retainer having an inner periphery and an outer periphery, an elastomeric seal attached to and extending radially from a periphery of said retainer, said gap having a predetermined nominal dimension, said elastomeric seal being joined to said retainer and having a thickness greater than said dimension, said retainer comprising a substrate and adjusting means for adjusting the thickness of said retainer to substantially said dimension in order to position said retainer in said gap, said retainer being of a configuration to fit said gap to provide an interface between said complementary faces, said substrate section being a rigid plate having a thickness less than said dimension, said adjusting means comprising a shim section overlying said substrate, said shim section comprising a plurality of shim layers removably joined together, each said shim layer being a thin flexible plate of substantially the same configuration as said substrate section, said shim section being peelably joined to said substrate section and having together with said substrate section an overall thickness substantially greater than said dimension, whereby individual shim layers are peelably removed until said overall thickness is substantially the same as said dimension to position said retainer in said gap.

* * * * *